(12) United States Patent
Gordin et al.

(10) Patent No.: US 7,848,079 B1
(45) Date of Patent: Dec. 7, 2010

(54) MULTI-CAPACITOR ASSEMBLY

(75) Inventors: Myron K. Gordin, Oskaloosa, IA (US);
Gregory N. Kubbe, Ottumwa, IA (US);
Kurt Charles Herr, Jr., Centerville, IA (US)

(73) Assignee: Musco Corporation, Oskaloosa, IA (US)

( * ) Notice: Subject to any disclaimer, the term of this patent is extended or adjusted under 35 U.S.C. 154(b) by 994 days.

(21) Appl. No.: 11/624,604

(22) Filed: Jan. 18, 2007

Related U.S. Application Data

(60) Provisional application No. 60/759,667, filed on Jan. 18, 2006.

(51) Int. Cl.
*H01G 4/38* (2006.01)
(52) U.S. Cl. .................... 361/328; 361/329
(58) Field of Classification Search ........... 315/209 CD, 315/209 M, 227 R, 228–232; 361/303.01, 361/307, 328, 600; 362/328–3
See application file for complete search history.

(56) References Cited

U.S. PATENT DOCUMENTS

| | | | | |
|---|---|---|---|---|
| 4,405,963 A | * | 9/1983 | Holtzman | 361/16 |
| 4,994,718 A | * | 2/1991 | Gordin | 315/240 |
| 6,327,137 B1 | * | 12/2001 | Yamamoto et al. | 361/517 |
| 6,600,272 B2 | * | 7/2003 | Matsui et al. | 315/246 |
| 6,798,677 B2 | * | 9/2004 | Jakob et al. | 363/123 |
| 6,819,545 B1 | * | 11/2004 | Lobo et al. | 361/534 |
| 6,969,304 B2 | | 11/2005 | Takanashi et al. | |
| 2005/0184681 A1 | | 8/2005 | Gordin et al. | |

OTHER PUBLICATIONS

Knisley, Joseph R., "The Art of Troubleshooting Arc Discharge Lamps", Jun. 1, 1999, downloaded from http://ecmweb.com/mag/electric_art_troubleshooting_arc/. (7 pages).
"Home Harvest Garden Supply" "HID Lamp Capacitors & Ignitors", (date unknown), downloaded from http://homeharvest.com/lampcomponentscapsignitors.htm, (4 pages).
Alibaba.com "Yate Lighting Technology Co., Ltd." "Lighting Capacitors", (date unknown), downloaded from http://yatelighting.en.alibaba.com/product/50056888/50258405/Lighting_Capacitors/Light..., (2 pages).
"Venture's Lighting", "Ventures Technical Information—Capacitors,", (date unknown), downloaded from http://www.venturelighting.com/TechCenter/Capacitors.html, (date unknown), (2 pages).

* cited by examiner

*Primary Examiner*—Douglas W Owens
*Assistant Examiner*—Minh D A
(74) *Attorney, Agent, or Firm*—McKee, Voorhees & Sease, P.L.C.

(57) ABSTRACT

A capacitor assembly comprises a capacitor housing wherein a relatively larger main capacitor and at least one relatively smaller secondary capacitor can be enclosed and include an efficient and simple combination of electrical connections from the multiple capacitors to an external electrical connection interface. Another aspect includes a capacitor housing wherein volumetric efficiency is enhanced by the arrangement of the multi-capacitors within a given volume of a cavity of the housing. For a given size main capacitor and one or more secondary capacitors, the total volume of space occupied by those capacitors and the housing is minimized to take up minimum room in an electrical box.

5 Claims, 16 Drawing Sheets

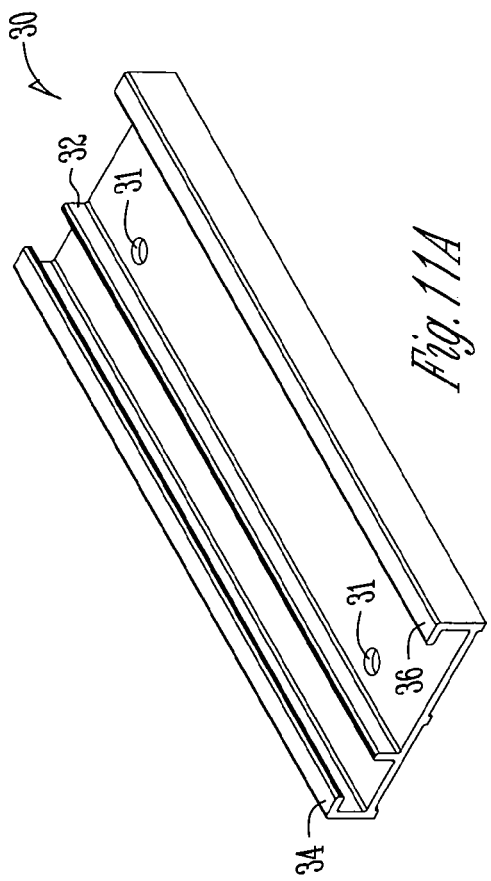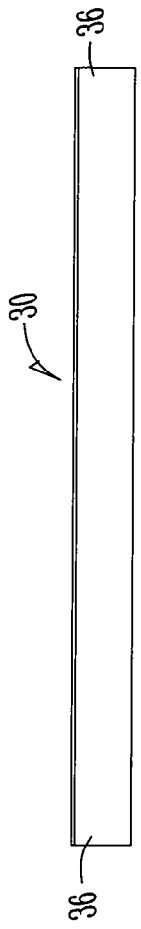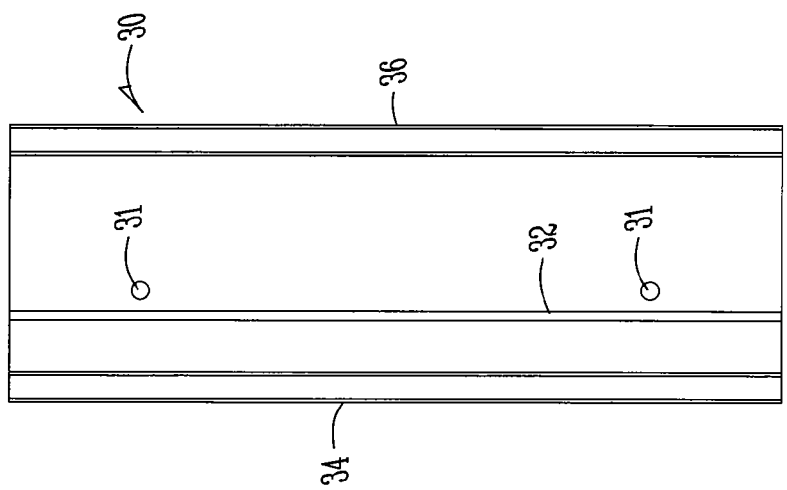

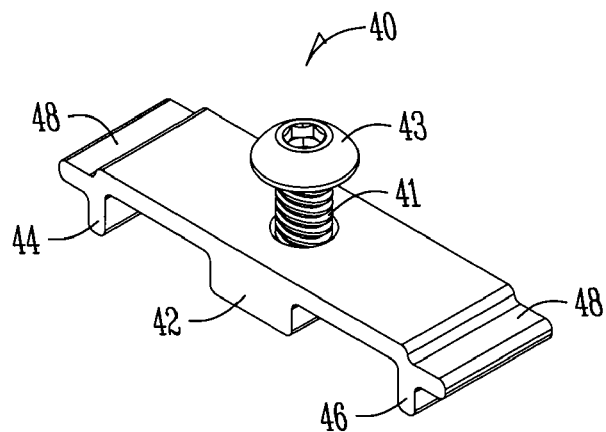
Fig. 12A
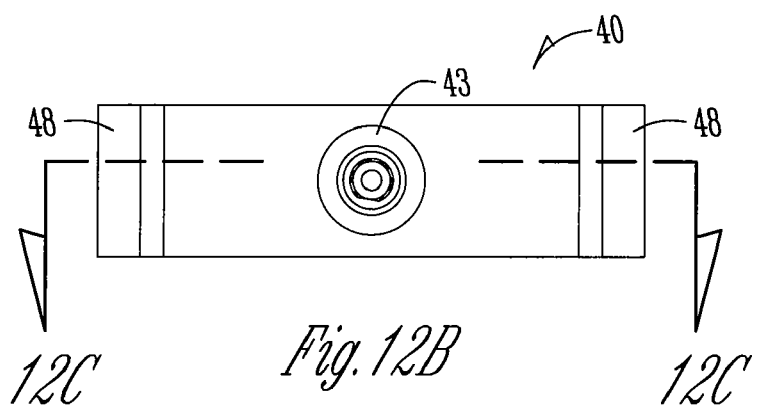
Fig. 12B
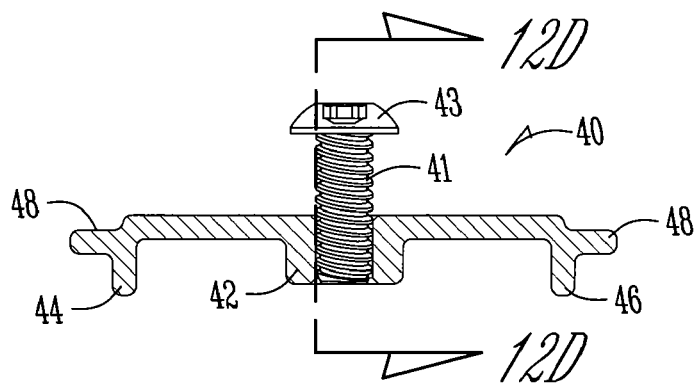 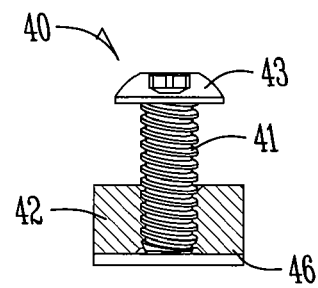
Fig. 12C              Fig. 12D

MULTI-CAPACITOR ASSEMBLY

CROSS-REFERENCE TO RELATED APPLICATIONS

This application claims priority under 35 U.S.C. §119 of a provisional application Ser. No. 60/759,667 filed Jan. 18, 2006, and which application is hereby incorporated by reference in its entirety.

I. BACKGROUND OF THE INVENTION

A. Field of the Invention

The present invention relates to a capacitor assembly that includes a plurality of capacitors connected to a common connection interface, and in particular, to a capacitor assembly that can include a plurality of capacitors efficiently contained inside a single, easily mounted and removed housing.

B. Problems in the Art

The need has been identified for a set of capacitors that can be assembled as an integrated unit. Preferably the unit would be easily installable or removable from an electrical cabinet.

One example of use would be for relatively high power lighting systems where a main capacitor, of relatively high capacitance value, assists in control of operating power to a lamp (e.g., a relatively high wattage, high intensity discharge (HID) lamp, such as 1,000 watts or more). One such system is disclosed in U.S. Pat. No. 4,994,718 and available commercially under the trademark MULTI-WATTT™ from Musco Corporation of Oskaloosa, Iowa, USA.

A system which uses one or more smaller capacitors selectively hooked in parallel with a main capacitor to selectively add incremental amounts of capacitance to the lamp circuit to increase operating power to the lamp is commercially available under the SMART LAMP™ system available from Musco Corporation of Oskaloosa, Iowa, USA. See also published U.S. Patent Application No. 2005/0184681 A1, which is incorporated by reference in its entirety herein. Each lamp circuit would have such a capacitor combination available to it.

Normally single, can-type capacitors, as well as other parts of the lamp circuits (and other electric components) are individually mounted in an electrical cabinet. Space is a consideration for these individual capacitors. It is desirable they be as space-efficient as possible. It is desirable for multiple capacitors to be enclosed in a single mountable housing in an efficient manner.

As mentioned, it is desirable and advantageous to be able to quickly and easily, without special tools, install and remove capacitors from an electrical box. U.S. Pat. No. 6,969,304, (incorporated by reference herein in its entirety) to Musco Corporation discloses one example of a quick connect bracket for relatively large can-type capacitors. A bolt or rod on a bracket holding the capacitor basically can be laid or placed into a U-shaped receiver that is screwed, bolted or welded to a vertical wall of the electrical box. The capacitor can thus be relatively quickly and easily mounted or removed.

There are additional needs that have been identified for a multiple capacitor assembly for these types of applications. One is heat management. Because the capacitors are handling high levels of electrical current, effective electrical and heat insulation is important. Volumetric efficiency is also important. By this it is referred to whether the package for the capacitors effectively utilizes the space in which the entire capacitor occupies to perform not only its capacitance function but its electrical and heat insulation functions.

Efficient electrical connection of the multiple capacitors to the lamp circuit is also important. There cannot be substantial electrical losses or costly or fragile connections. Also, access to the capacitors is important.

Finally, especially for sports or other wide area lighting applications like the examples given herein, robustness and long-term durability, as well as economy and efficiency of operation, are important. Sports lighting systems are designed and desired to last for decades. They are frequently in outdoor environments and are therefore exposed to a wide variety of temperatures and conditions. Also, as previously mentioned, capacitors for lamp circuits are normally installed in electrical boxes. Other components are required. Therefore, efficient size and use of space is important.

Heretofore, the state of the art primarily used relatively large can-type main capacitors for each lamp. There was not much concern about enclosing them in a housing or packaging plural capacitors as an integrated unit for collective quick mount and dismount. However, the SMART LAMP™ system does use plural capacitors per lamp because of its innovation of changing operating power to a lamp by incrementally increasing capacitance in the lamp circuit during operating life.

Some state of the art capacitors utilize a conventional plastic dielectric insulating material inside their capacitor cans or cases. If there is a failure of this type of capacitor, it can result in overheating. If the level of overheating gets high enough, it can cause melting or combustion of the plastic material. It has been found that this combustion or overheating releases gases and smoke that can deposit or literally cover the entire interior of an electrical box. Moreover, they can damage or detrimentally affect other electrical components and essentially ruin the entire electrical box and its contents. And, of course, if combustion occurs, the danger and risk of fire and ancillary problems, such as electrical shock, can occur.

Therefore, a need has been identified for an improved multi-capacitor assembly of the type that is useful at least for applications of the nature described above.

II. BRIEF SUMMARY OF THE INVENTION

A. Objects of the Invention

A principle object, feature, advantage or aspect of the present invention is an apparatus and method which improves over or solves problems and deficiencies in the art.

Other objects, features, advantages or aspects of the invention include an apparatus and method which:

1) Allows multiple capacitors to be integrated in a single unit.
2) Allows multiple capacitors to be housed in an efficient volume and arranged effectively and efficiently inside the housing.
3) Allows for easy, quick, but reliable and durable installation and removal of capacitors from an electrical box or other mount.
4) Provides good heat and dielectric management.
5) Resists or eliminates risk of smoking or fire.
6) Allows easy assembly and efficient utilization of components.
7) Is robust and durable.
8) Is economical.
9) Is efficient.

These and other objects, features, advantages and aspects of the present invention will become more apparent with reference to the accompanying specification and claims.

B. Aspects of the Invention

One aspect of the present invention comprises a housing having a cavity that encloses multiple capacitors or capacitive elements (conductive plates separated by a dielectric layer) in the cavity. The housing includes external electrical connections to operatively electrically connect the capacitors to an external circuitry. It allows efficient mount and dismount of multiple capacitors with volumetric efficiency.

Another aspect of the invention is a capacitor housing including a base having structure designed to slide into a mounting bracket by having complimentary male and female structures on the base and the mounting bracket. It can include a locking piece that locks the capacitor housing from exiting the bracket.

Another aspect of the invention comprises a multi-capacitor housing wherein a relatively larger main capacitor and at least one relatively smaller secondary capacitor can be enclosed and include an efficient and simple combination of electrical connections from the multiple capacitors to an external electrical connection interface.

A further aspect of the invention includes a multi-capacitor housing wherein volumetric efficiency is enhanced by the arrangement of the multi-capacitors within a given volume of a cavity of the housing. For a given size main capacitor and one or more secondary capacitors, the total volume of space occupied by those capacitors and the housing is minimized to take up minimum room in an electrical box. Electrical connections are also improved.

Another aspect of the invention includes effective and efficient heat and dielectric management. One option is to utilize a non-combustible or non-out-gassing material around a capacitive element. One example is regular sand or silica sand. It has both relatively high heat conducting properties to dissipate heat from the capacitive element but also relatively high dielectric properties to electrically insulate the capacitive element from its case without risk of smoking or combustion.

A still further aspect of the present invention is an optional heat sensor system integrated into the capacitor assembly. The heat sensor system reacts to any temperature exceeding a threshold that is indicative of risk of danger or malfunction. If the threshold is exceeded, it disconnects power to a capacitor or to the entire capacitor assembly.

III. BRIEF DESCRIPTION OF THE DRAWINGS

Figure 1:
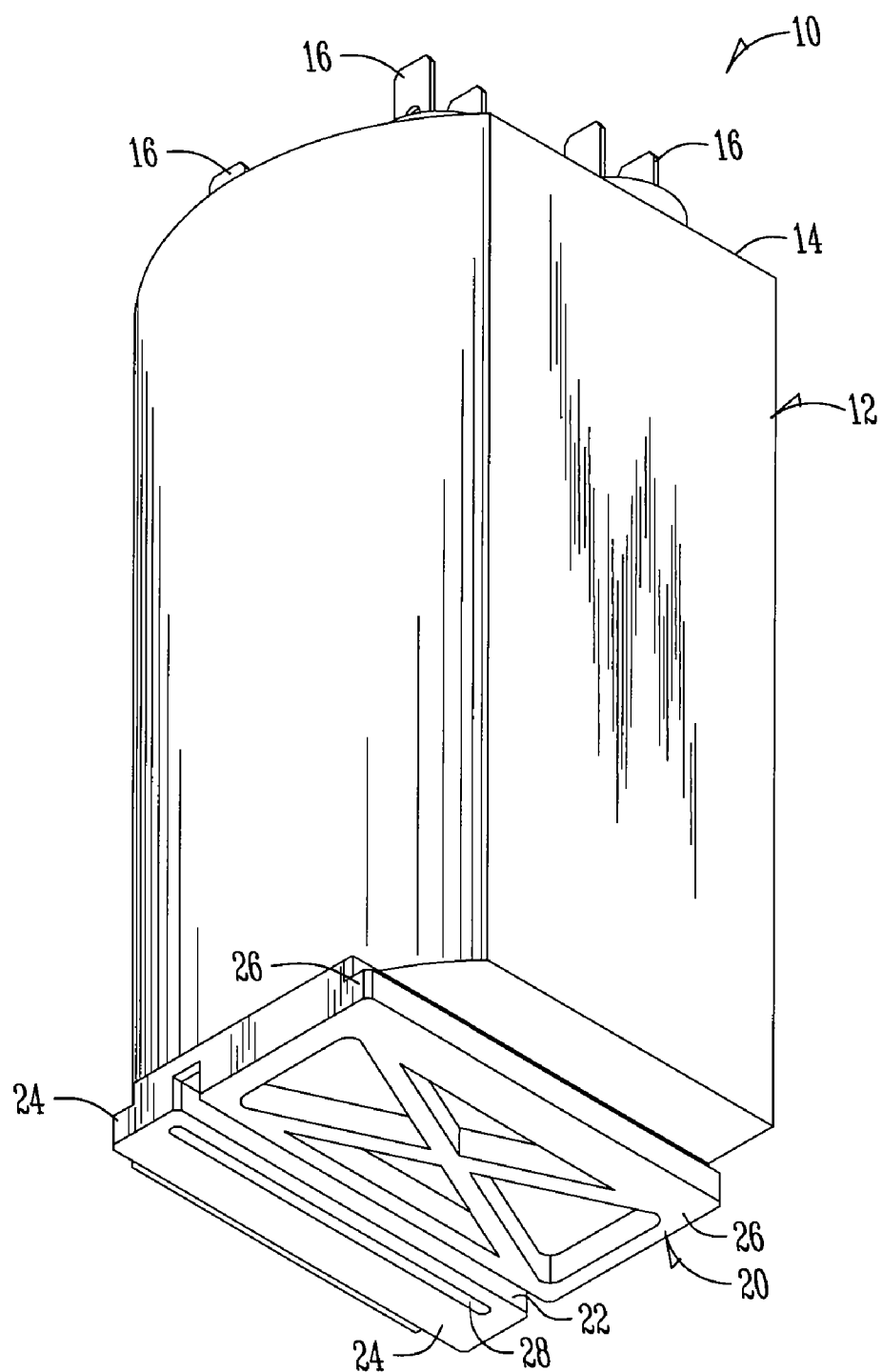
FIG. 1 is a perspective view of a capacitor assembly according to one aspect of the invention.
Figure 2:
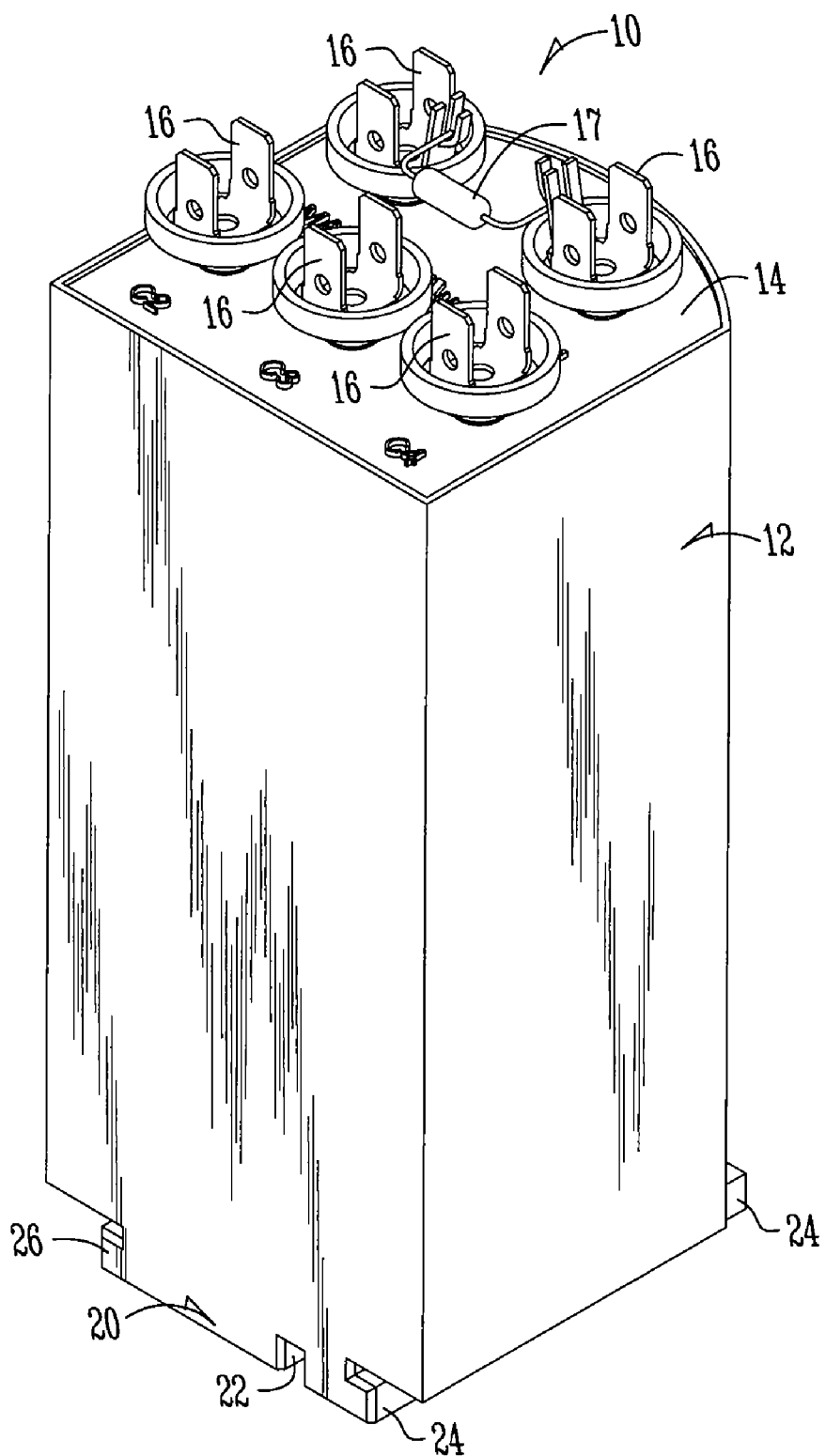
FIG. 2 is a perspective view of the capacitor assembly of FIG. 1 from a different perspective.
Figure 3:
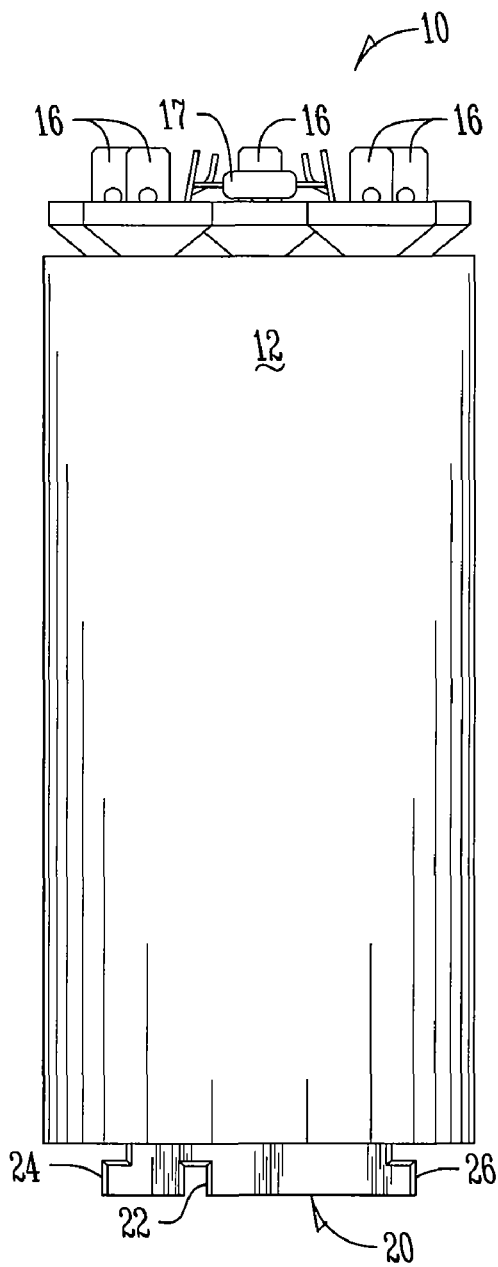
FIG. 3 is a top plan view.
Figure 4:
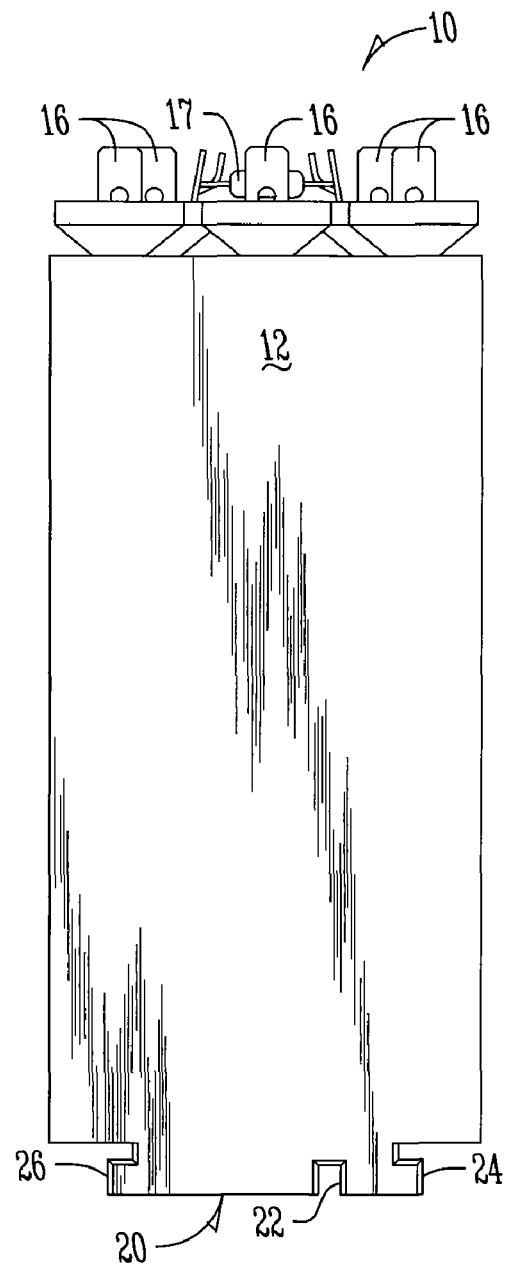
FIG. 4 is a bottom plan view.
Figure 5:
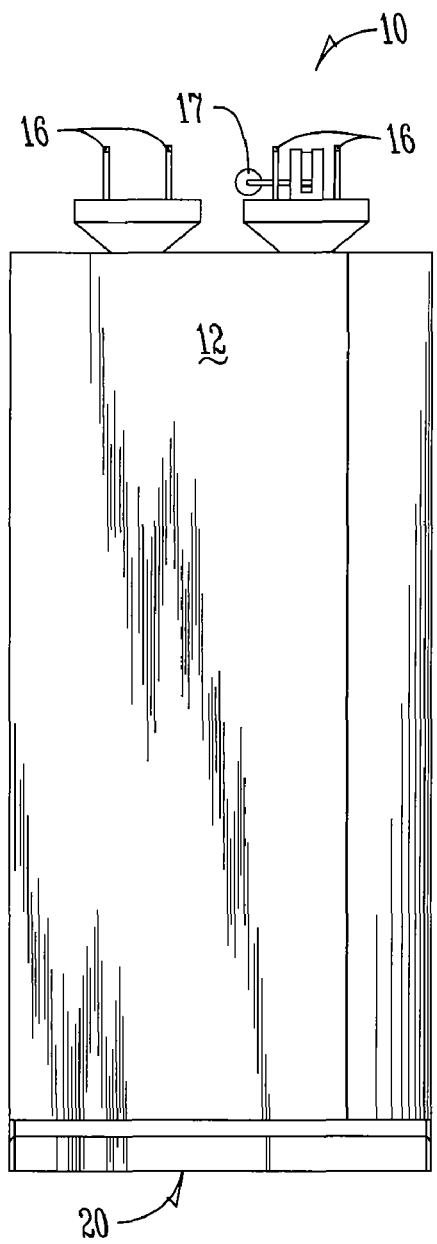
FIG. 5 is a side elevation view.
Figure 6:
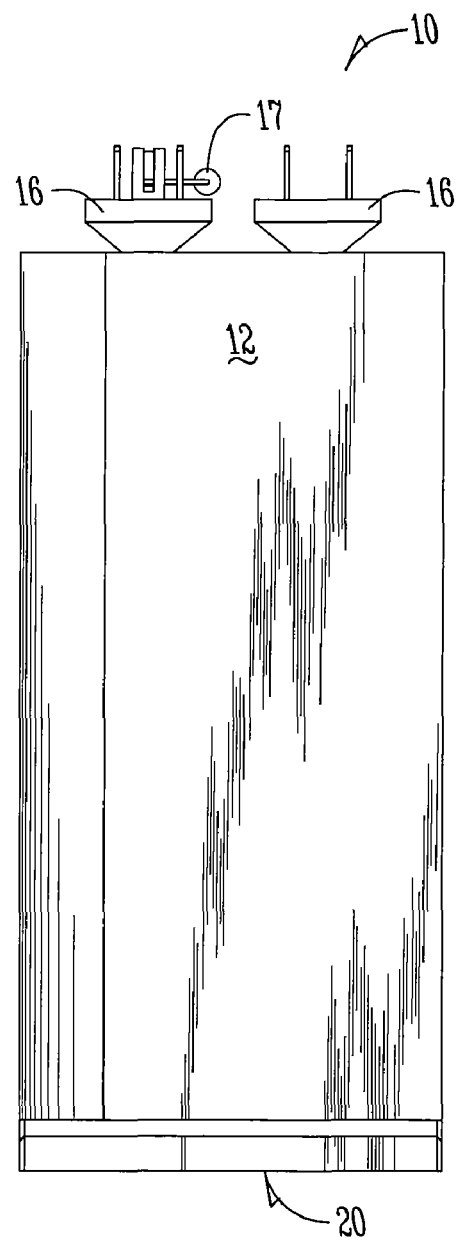
FIG. 6 is an opposite side elevation view.
Figure 7:
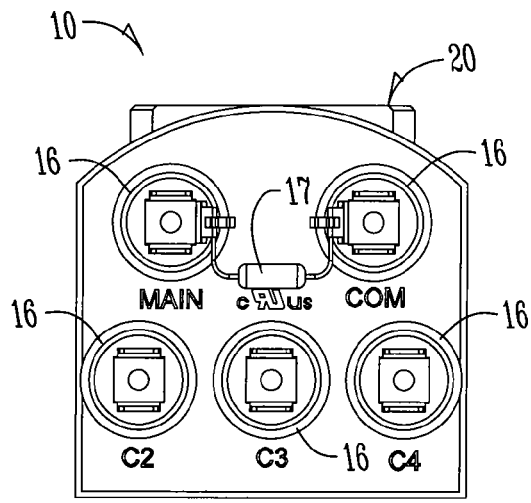
FIG. 7 is an end elevation view.
Figure 8:
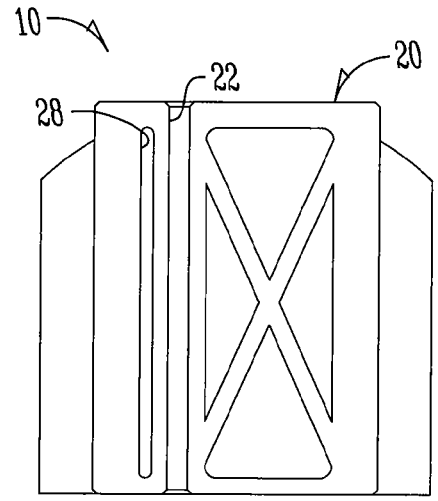
FIG. 8 is an opposite end elevation view of what is called the base of the capacitor assembly.
Figure 9:
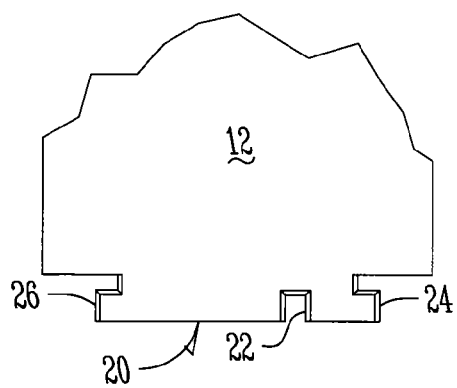
FIG. 9 is a partial detail from FIG. 4.

FIGS. 11A-D are perspective (FIG. 11A) and isometric views (bottom—FIG. 11B, end—FIG. 11C, side elevation—FIG. 11D) of a mounting bracket that can be used with the capacitor assembly of FIG. 1.

FIGS. 12A-D are perspective (FIG. 12A) and isometric views, in an enlarged scale, of a locking device that can be used with the mounting bracket of FIGS. 11A-D. FIGS. 12C and D are sectional views.

Figure 13:
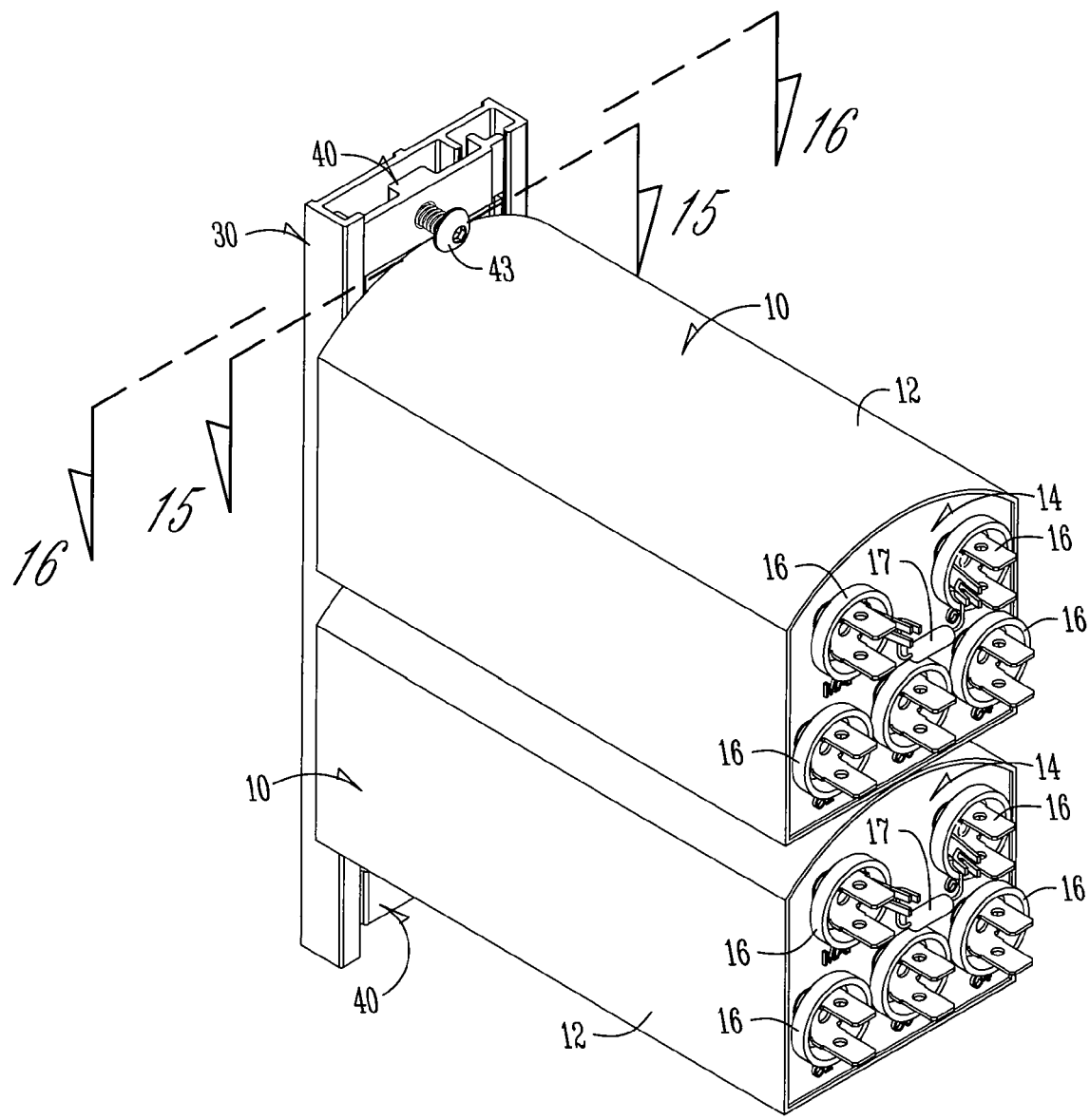

FIG. 13 is a simplified perspective diagrammatic view of two capacitor assemblies of FIG. 1 mounted to the mounting bracket of FIGS. 11A-D with a locking device of FIGS. 12A-D installed at both upper and lower ends of the mounting bracket.

Figure 14:
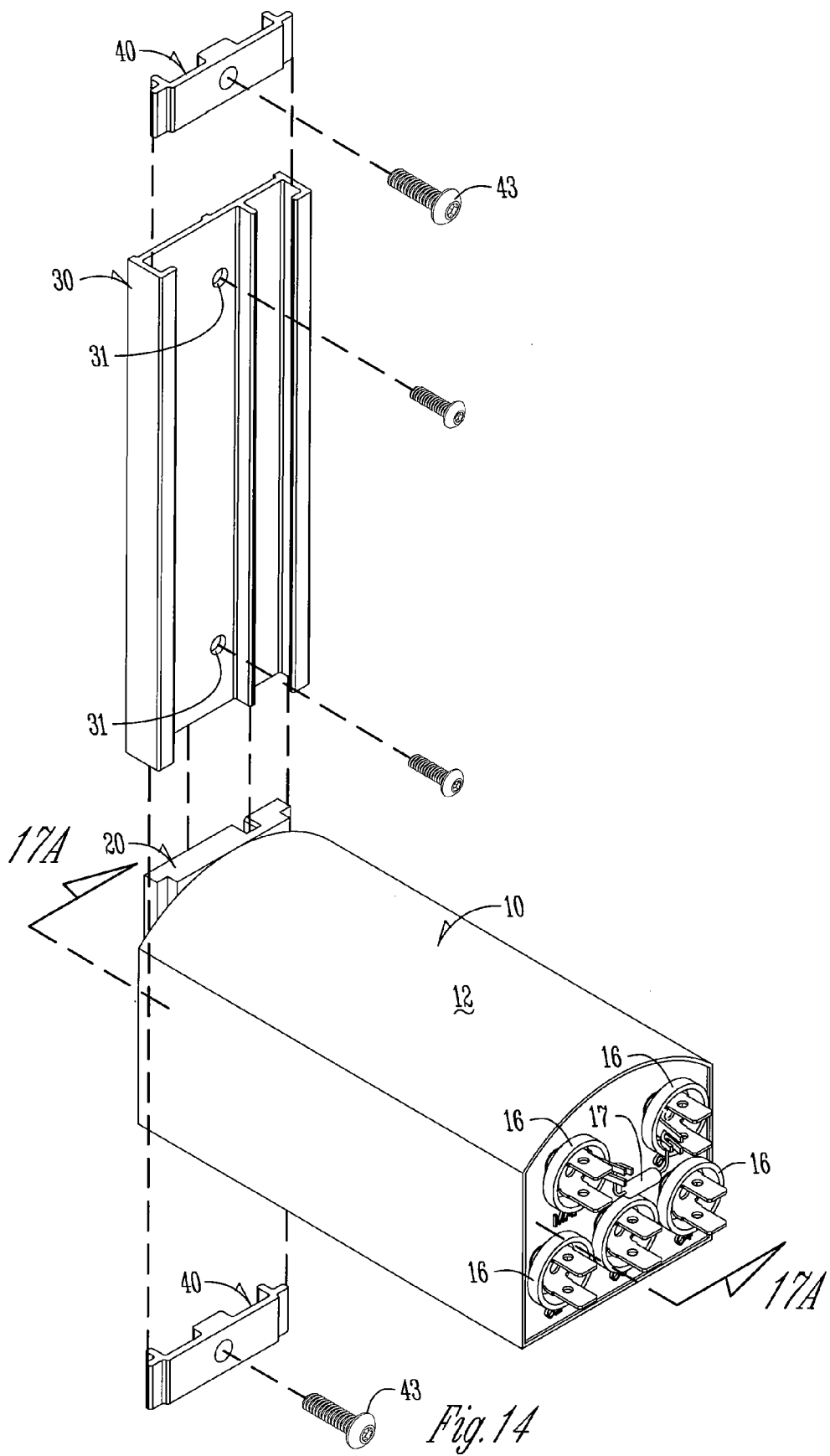

FIG. 14 is a partial exploded view of a single capacitor assembly of FIG. 1 and top and bottom locking devices such as shown in FIGS. 12A-D.

Figure 15:
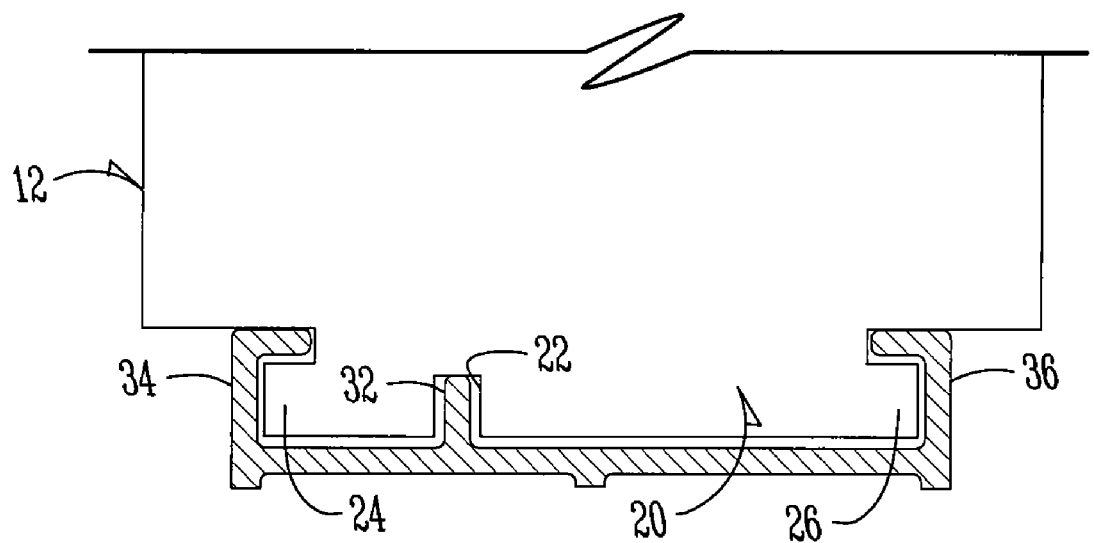

FIG. 15 is an enlarged partial plan view of the capacitor assembly operatively mounted in mounting bracket from a perspective of line 15-15 of FIG. 13.

Figure 16:
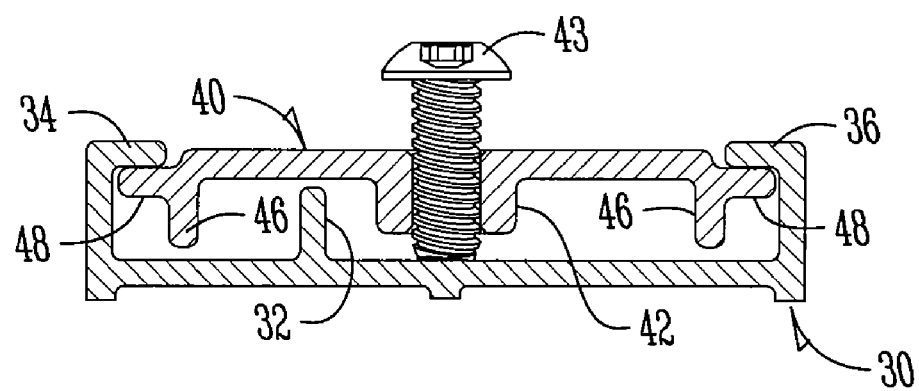

FIG. 16 is an enlarged plan view of the locking device operatively installed into the mounting bracket from the perspective of line 16-16 of FIG. 13.

Figure 17A:
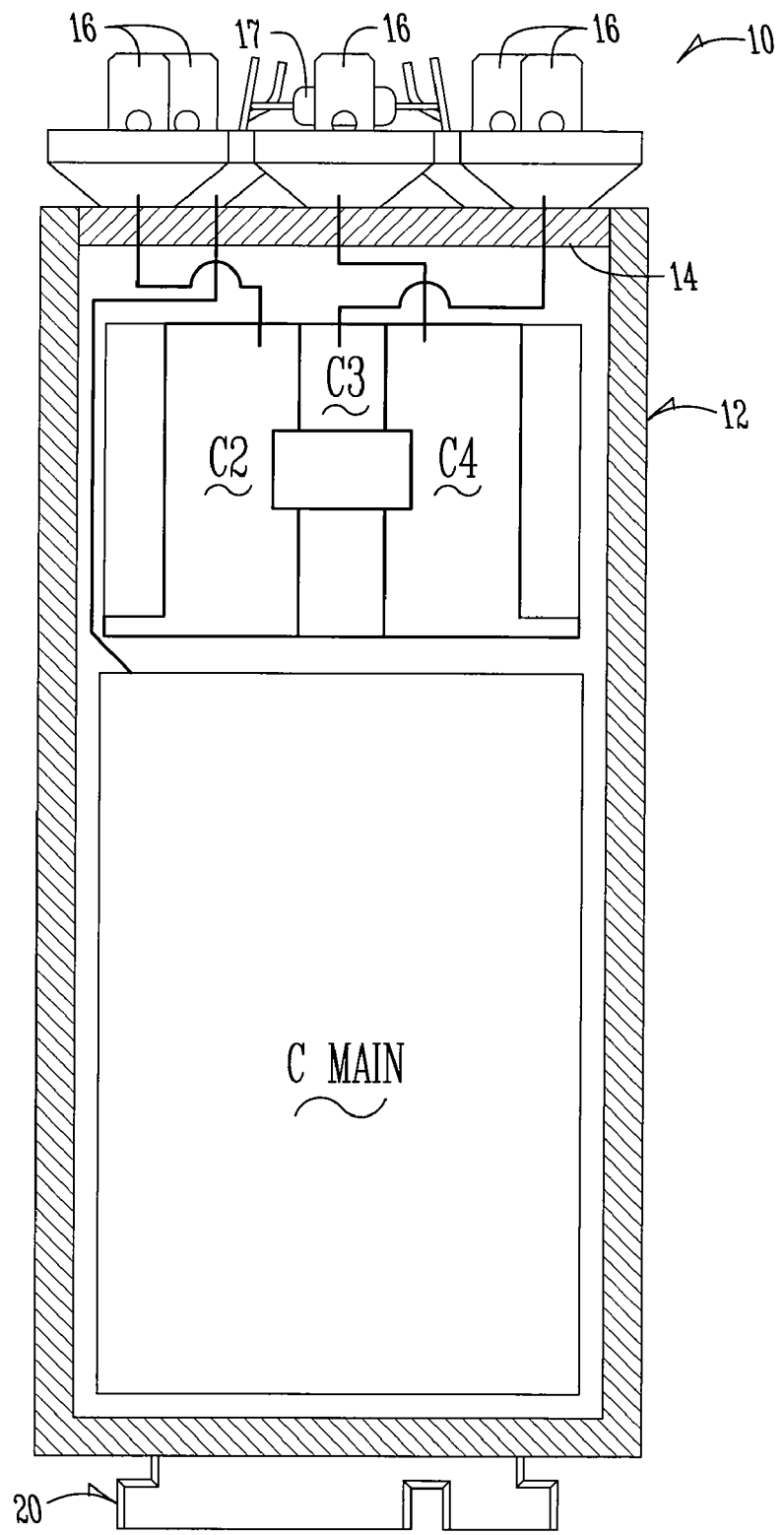

FIG. 17A is a sectional view taken along line 17A-17A of FIG. 14, showing multiple capacitors arranged inside the capacitor housing and diagrammatically showing connections to external electrical connections for the capacitor assembly.

Figure 17B:
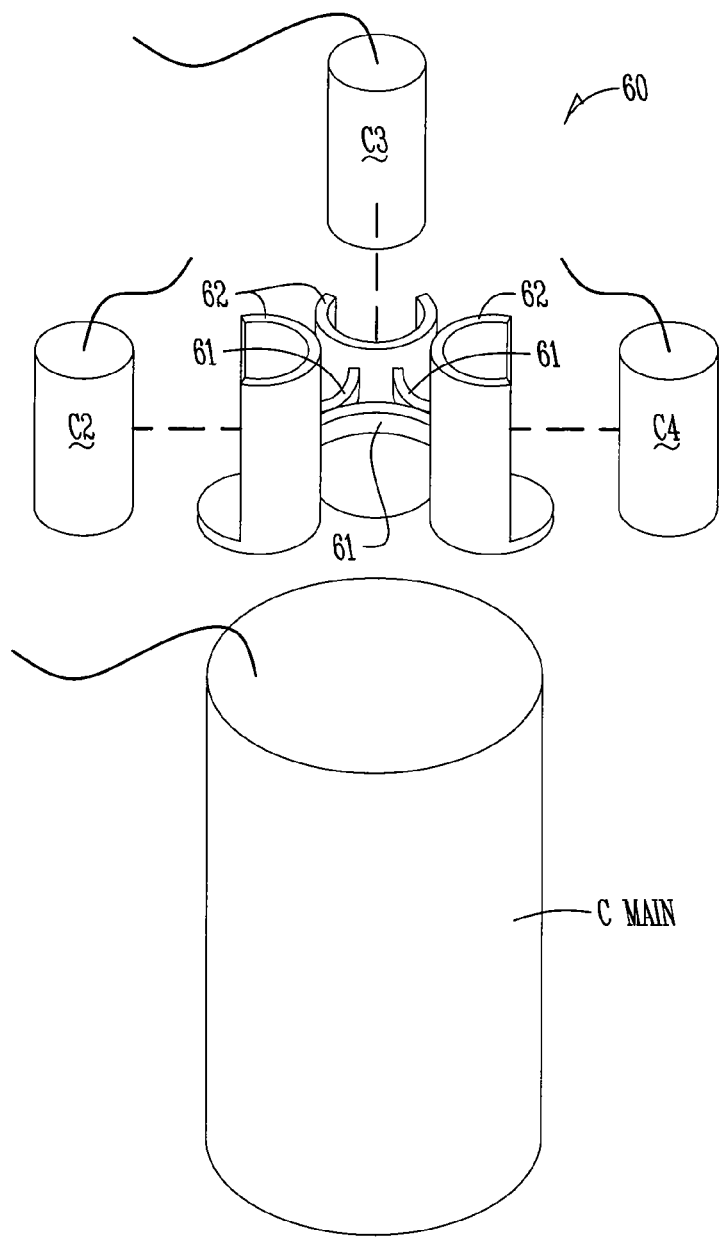

FIG. 17B diagrammatically illustrates, in isolated perspective, the large main capacitor and three smaller capacitors of FIG. 17A exploded from a mounting rack or cradle for the smaller capacitors.

Figure 17C:
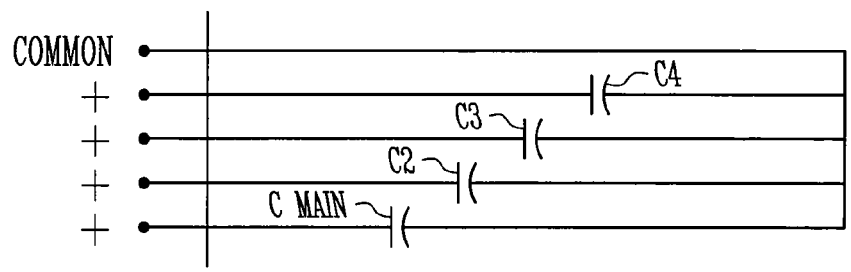

FIG. 17C is an electrical schematic of the electrical connections of the capacitor assembly of FIG. 17A.

Figure 18:
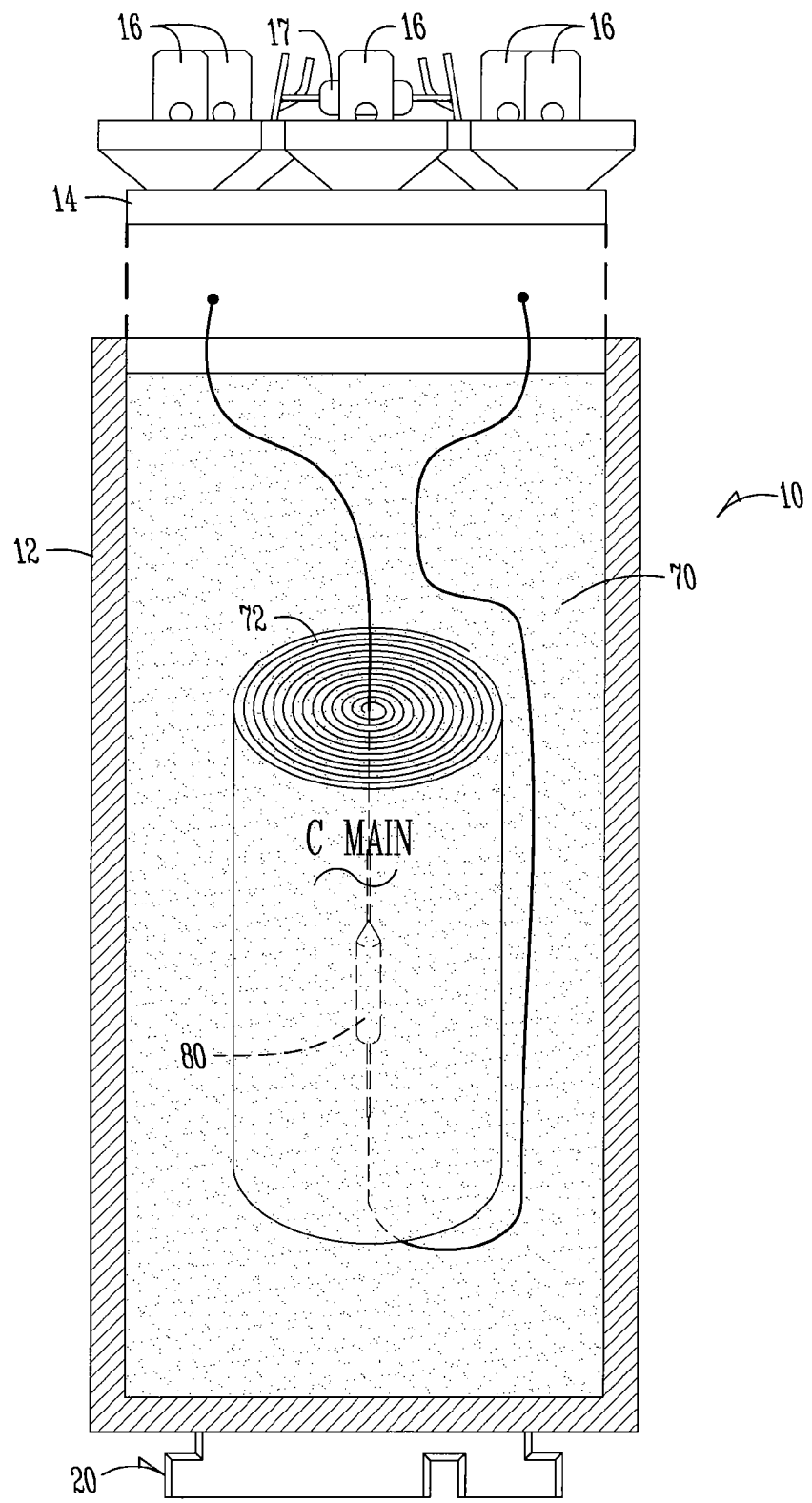

FIG. 18 is a sectional view like FIG. 17A but with a removable lid shown in exploded form and a single capacitor with an internal thermal fuse.

Figures 19A, 19B:
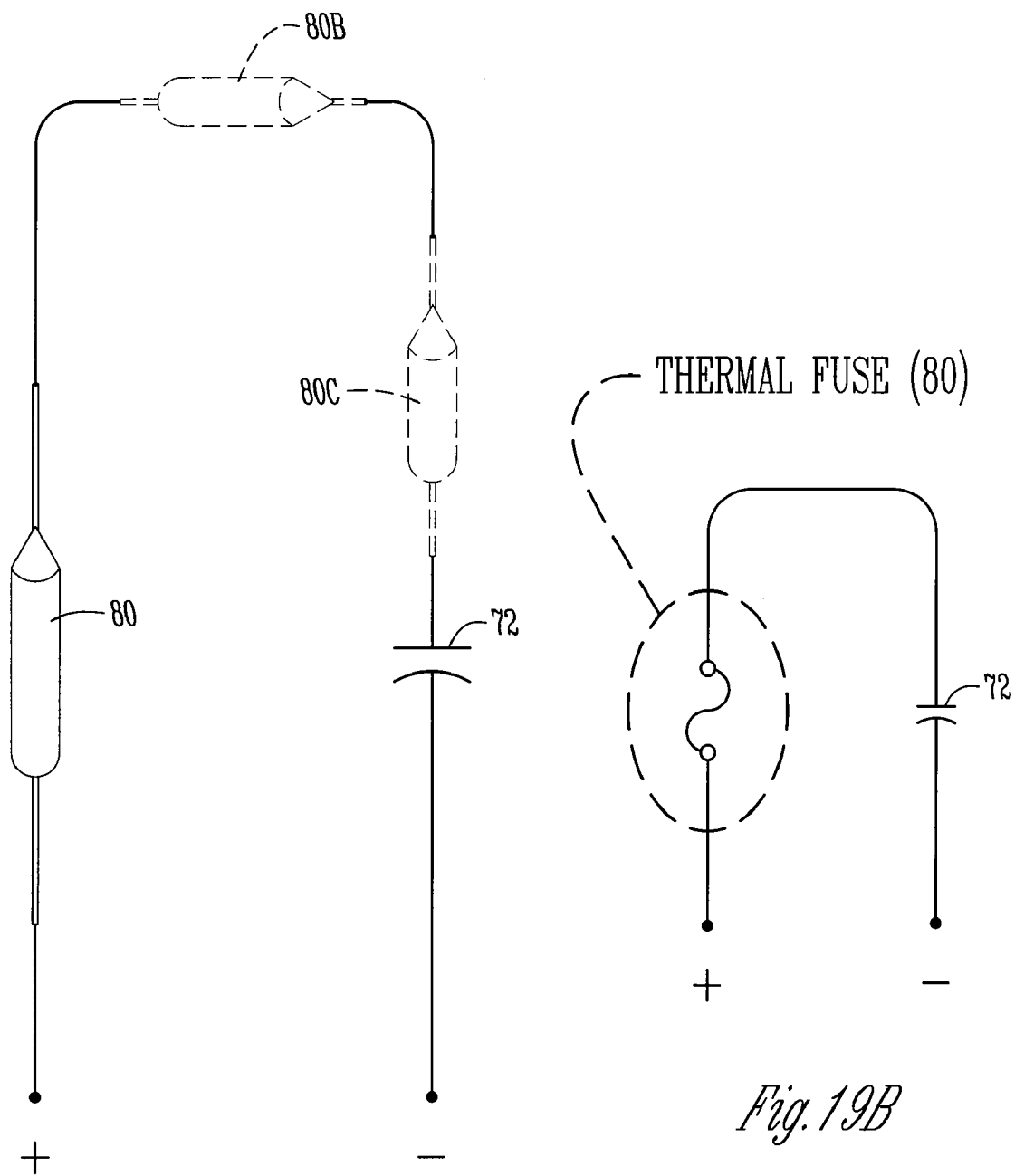

FIG. 19A is a partial diagrammatic view of a thermal fuse of FIG. 18 that can be used in any of the capacitor assemblies.

FIG. 19B is an electrical circuit diagram of one embodiment of a capacitor assembly with a thermal fuse according to the invention.

Figure 20B:
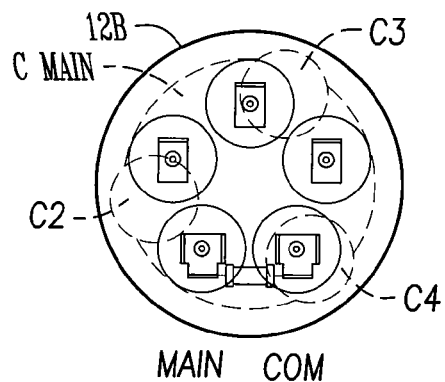
Figure 20A:
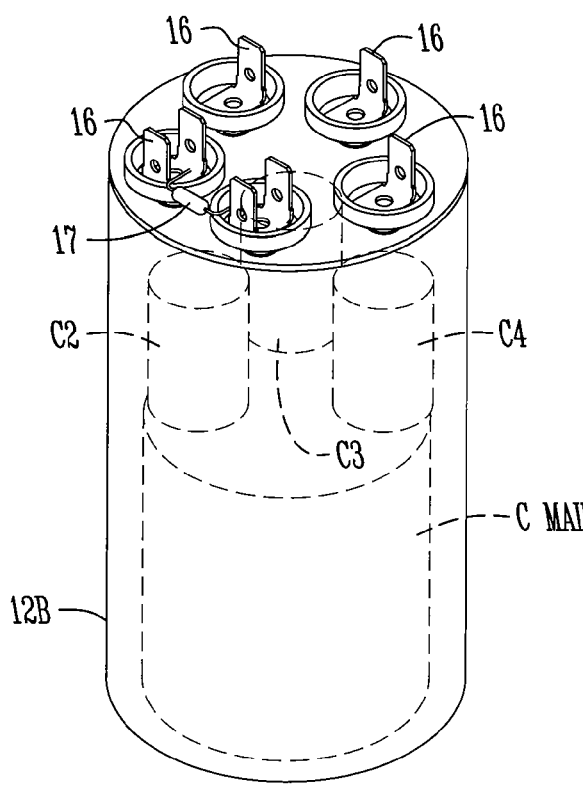

FIG. 20A is a perspective view of an alternative embodiment of the invention.

FIG. 20B is a top view of FIG. 20A.

Figure 20C:
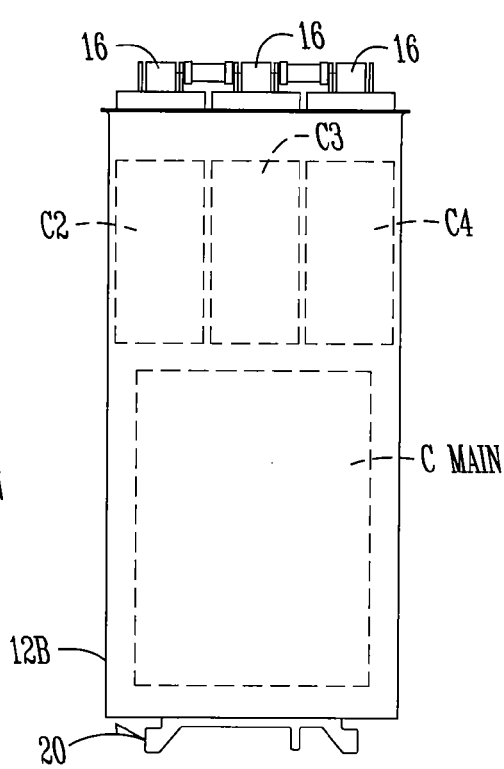

FIG. 20C is an end view of FIG. 20A.

Figure 21:
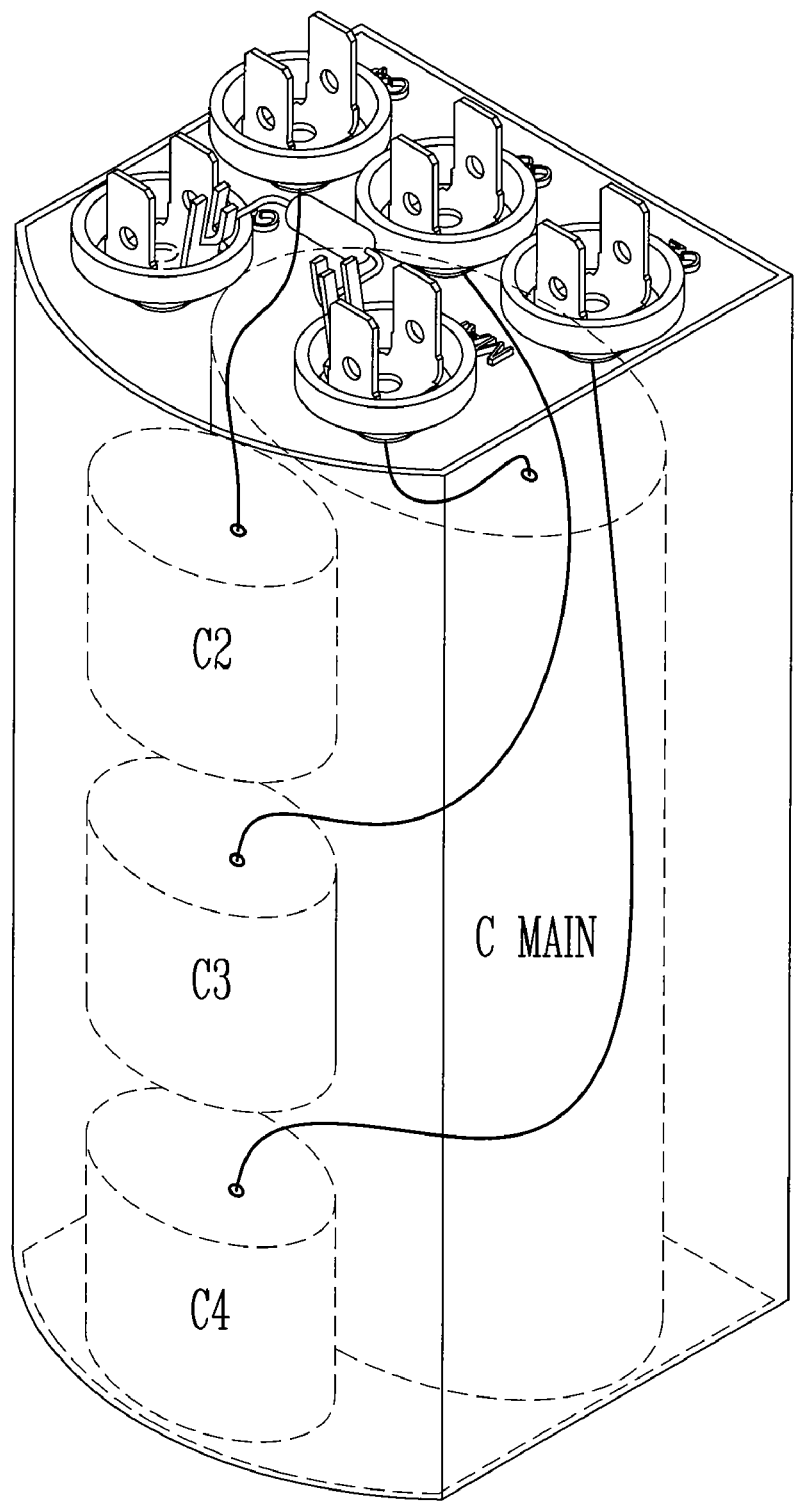

FIG. 21 is an illustration of an alternative efficient arrangement of multiple capacitors in a single multi-capacitor housing.

IV. DETAILED DESCRIPTION OF THE PREFERRED EMBODIMENT

A. Overview

For a better understanding of the invention and its aspects, one example of a form it can take will now be described in detail. Variations obvious to those skilled in the art will be included within this detailed description. It is to be understood, however, that this detailed description or the examples do not limit the invention but are merely illustrative of forms it could take.

B. Capacitor Assembly Generally

By referring to the drawings, a capacitor assembly (referred to generally by reference number 10) includes dielectric external housing 12 which encloses multi-capacitors (here four) C Main, C2, C3, and C4. Housing 12 includes a removable end or lid 14 that includes appropriate electrical connections 16. In this example, each capacitor CMain, C2, C3, and C4 does not have its own can or covering. Each is a capacitive element comprising conductive plates separated by a dielectric layer. It is possible, however, to insert canned capacitors into housing 12 in the manner contemplated by the invention. Housing 12 also includes a base or foot 20 at an opposite end that is integrated with or connected to housing 12, and has a geometry that allows it to be slid into complimentary mounting bracket 30 (FIGS. 11A-D) that can be fixed by screws, bolts, or welding to the interior of an electric cabinet or other mounting surface or support.

Some of the advantages of capacitor assembly 10 are as follows. It provides a dielectric enclosure for plural capacitors in an integrated package that can be quickly and easily installed and removed from an electrical box or other mount. Its design maximizes volumetric efficiency for the capacitors relative to package size, minimizing the amount of space the assembly takes up. The arrangement and configuration of the capacitors appears to improve over problems experienced with other configurations, such as with respect to factors including operational life, resistance to malfunction or failure, and availability of a main, relatively larger capacitor and at least one relatively smaller capacitor. It also allows for efficient and effective connection to an external circuit. Additional advantages will be apparent from this specification.

C. Capacitor Assembly Housing

As illustrated in the drawings, and particularly FIGS. 1-10 and 13 and 14, housing 12 can present an integrated enclosing structure for multiple compacitors that can be molded or formed with an integral base 20 for mounting to a mounting bracket. Capacitor housing 12 is made from natural PBT (polybutylene terephthalate engineering resin) (so is removable cover or lid 14). It can be made from other materials and in other shapes. Its dimensions are roughly 5½ inches along its longitudinal axis, and 2.5 inches by 2.5 inches in cross-section. The lid or cover 14 can be attached or seated into one end of housing body 12 on a recessed ledge by adhesives or other means.

External electrical connections 16 are built into cover 14. These connections 16, otherwise called leads, in this example are combo terminals (5 in number), 0.250 inches by 0.031 inches, quick disconnect blades per ANSI/UL 310 plus a solderable fork on each of the two terminals. A bleed resistor 17 (FIG. 17A) is soldered across the solderable forks from "main" to "com" (the common terminal).

The foregoing combination is designed for use in one embodiment of the SMART LAMPT™ system of Musco Corporation (see published U.S. Application No. 2005/01894681 A1). It is adapted to be connected into the lamp circuit for a nominal 1500 watt lamp. Of course, it can adapt to other HID lamps of different types and wattages. The capacitive values and other operational specifications for each connector can be selected according to need.

Figure 10:
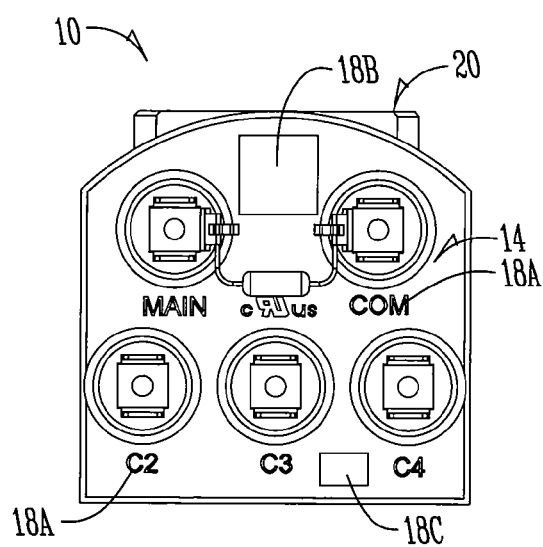
FIG. 10 is similar to FIG. 7 with some additional optional details.

Optional use of indicia 18A, as shown in FIG. 10, allows identification of the leads or connections 16 on the exterior of housing 12 so that a worker knows precisely what they connect to. This can be molded directly into cover 14.

Space 18B (FIG. 10) optionally could be used for applying a number or other identifying indicia regarding load for which the capacitors are designed. For example, in lighting systems, it could identify which specific lighting fixture the capacitor is hooked into. Space 18C (FIG. 10) could be used for other indicia, including date code of a capacitor or other information.

D. Quick Mount Base 20

By referring to the figures, particularly FIGS. 1-4, 8, 9, and 13-14, the geometry of base 20 can be seen. Basically rectangular, a slot 22 extends from top to bottom of base 20. On opposite sides of slot 22 are L-shaped legs 24 and 26. A small elongated shallow slot 28 can be parallel to slot 22 and additional material can be removed to leave the X-shape in the bottom of base 20. This minimizes the amount of material (and weight) of housing 12, and the X-shape can also serve to enhance structural strength and durability.

FIGS. 11A-D show an elongated mounting bracket 30. It includes rail 32 and inverted L-shaped walls 34 and 36 on opposite sides that cooperate complimentarily with base 20 such that base 20, in the direction of the longitudinal axis of slot 22, can be slid into either end of mounting bracket 30 and held against transverse movement across mounting bracket 30 or against any movement except along the longitudinal axis of bracket 30. In this embodiment, mounting bracket 30 can vary in length along its longitudinal axis. This example can vary from between approximately 5 inches to 8 inches long so that it can accommodate more than one capacitor assembly 10 (see, e.g., FIG. 13). It is approximately 2 inches in width and ½ inch thick at its L-arm shaped opposite walls 34 and 36. It can be made of extruded metal such as aluminum.

If made of metal, it can be welded to the vertical inside wall of metal enclosure box. Alternatively, FIG. 11A shows openings 31 could be used to screw or bolt it to some vertical or other support. Other mounting methods are, of course, possible.

The geometry of mounting bracket 30 and the geometry of base 20 allows capacitor assemblies 10 to be slid from either end of bracket 30, and held from relative movement other than longitudinally along bracket 30. See FIG. 15. Bracket 30 and base 20 are complimentary to one another and serve as a mounting guide and as partial securement to each other. The offset of rail 32 from the center allows capacitor assemblies 10 to only be inserted in one orientation along bracket 30. Thus, a very quick but non-complex, and economical but durable and secure mounting combination is presented.

E. Locking Mechanisms 40

FIGS. 12A-D illustrate locking member 40 that can be used to lock one or more capacitor assemblies 10 into mounting bracket 30. Alternatively called an end stop, an opening 41 in a thickened middle section 42 has internal threads and receives cap screw 43 (socket number 10-24 by 0.50 btnhd cap screw). Parallel outer walls 44 and 46 cooperate with longitudinally extending ledges 48 to complimentarily fit into the gap between L-walls 34 and 36 in mounting bracket 30 of FIGS. 11A-D as shown in FIG. 16. Cap screw 43 can be turned down towards locking member 40 until its distal end comes into abutment with the facing surface of bracket 30 (see FIG. 16). The length of cap screw 43 is selected relative to the size of mounting bracket 30 such that it lifts legs 44 and 46 so that ledges 48 abut the interior side of L-walls 34 and 36 in a sort of wedging action to lock locking device 40 in place along mounting bracket 30. In this manner, locking member 40 becomes an adjustable end stop. It can be adjusted along bracket 30 to come into abutment with one end of base 20 of capacitor assembly 10 to hold it against movement in its direction along bracket 30 (see FIG. 1.3). Obviously, a second mounting member or end stop 40 could be placed at the opposite side of any capacitor assemblies 10 in mounting bracket 30 to preclude longitudinal movement in that direction (see FIGS. 13 and 14).

F. Multiple Capacitor Assemblies 10

As illustrated in FIG. 13, multiple capacitor assemblies 10 could be slid into mounting bracket 30 and brought into abutment with one another. A pair of end stops 40 could be slid inwardly from opposite ends to abutment with the closest capacitor assembly 10 and cap screws 43 turned down to lock everything into position. One end stops 40 could be used just in the bottom of bracket 30, or more than two could be used, depending on the size of bracket 30 and size and numbers of assembly(ies) 30.

FIG. 14 shows just one capacitor assembly 10 in position to be slid onto bracket 30 and also shows locking members 40 in exploded form. The embodiment allows one or more assemblies to 10 to be mounted (limited by the length of bracket 30).

FIGS. 15 and 16 show the relative geometries of base 20 to mounting bracket 30 and locking member 40 to mounting bracket 30 when operatively connected.

G. Volumetric Efficiency

FIG. 17A illustrates how four capacitors C Main, C2, C3, and C4 can be fit into housing 12. This design allows C Main to be designed to be rather short and squat yet fill up virtually the entire width of the cavity of housing 12 at one end of that cavity near base 20. By allowing it to fill up that entire cavity, the main capacitor can be made cylindrical, which has been found to be more reliable and better for use and operation for such a capacitor. It would have similar capacitance capabilities to C Main of FIG. 21. Compare this with capacitor C Main in FIG. 21, which is much taller and leaner.

As shown in FIG. 17B, what is called a rack or cradle 60 has three receivers 62 connected by a middle web 61. This piece 60 can be made of plastic or other molded dielectric material and essentially allow the smaller capacitors C2, C3 and C4 to be snap fit (otherwise mounted) in radial orientation around its middle and above the main capacitor. Therefore, the essential overall diameter of housing 12 is a function of the diameter of the main capacitor, which again can be maximized in diameter. This frees up space above it because it can be made shorter and then allows placement of the other capacitors above it.

H. Electrical Connections

FIG. 17C shows diagrammatically the connection of each of the capacitors to electrical connection 16. Note FIGS. 17A and B diagrammatically illustrate that the length of each of the connecting wires from capacitors to leads on lid 14 can be shortened compared to that in FIG. 21; at least for some of the smaller capacitors, which is another advantage.

I. Heat and Dielectric Management

FIG. 18 illustrates a cross-section of the interior of housing 12 with the main capacitor, C Main, illustrated diagrammatically. An uncanned capacitive element 72 is surrounded by an insulating material 70 in housing 12. Optionally, material 70 can be silica sand instead of the usual plastic. As described previously, silica sand has relatively good thermal conducting properties but at the same time has relatively good dielectric properties. It is also noncombustible and does not out gas or smoke. A canned or can-type capacitor could also be used and surrounded by insulating material 70, including sand or silica.

J. Overheating Failsafe

FIGS. 18, 19A and B illustrate that one or more thermal fuses 80 (as are commercially available) can be inserted into the circuit of FIG. 17A (See FIG. 19A). If a fuse senses a temperature exceeding its threshold, the fuse will become permanently non-conducting (it is non-resettable) and shuts off electrical power to capacitor 72. This will ensure that overheating will not lead to explosion or fire. It can be located in the hard center core of the main winding element 72 of C Main, because heat would many times be detected quicker for a fail-safe mode than if placed outside the capacitor.

A thermal fuse 80 could be placed in or near each capacitor in housing 12. Still further, multiple or plural thermal fuses 80 might be placed in or around different positions relative each capacitor. Examples would be a thermal fuse at multiple locations in at or near a capacitor (e.g., one in the middle similar to FIG. 18, but one on the outside, and one at the top). FIG. 19A diagrammatically illustrates use of one thermal fuse 80, or two or three or more (see additional thermal fuses 80B and 80C). It has been found that multiple fuses placed at different positions in and/or around a capacitor tends to increase reaction time to over-heating conditions and thus may be more effective to automatically sense over-heating and shut off power before damage occurs.

K. Options and Alternatives

It will be appreciated that the invention can take many forms and embodiments. Variations obvious to those skilled in the art will be included within the invention.

For example, the specific materials, material properties and characteristics, and dimensions and configuration of the assembly 10, bracket 30, and their components can vary.

FIGS. 20A-C illustrate an alternative embodiment according to the invention. It is similar to that of embodiment 10 of FIGS. 1-10, and 17A-C and 18 except as follows. Its housing 12B is cylindrical as compared to the predominantly rectangular-in-cross-section shape of housing 12. As illustrated in FIGS. 20A-C, this housing 12B allows a larger capacitor C-MAIN to occupy substantially all of the interior volume of one end of housing 12B and a plurality of smaller capacitors (here three C1, C2, C3) to occupy substantially all of the remaining interior space for volumetric efficiency.

The case or housing 12b could be a dielectric material as described with respect to housing 12. Alternatively, it could be a metal can or case such as aluminum.

Conventional insulating material 70 could be used, or sand or silica, such as described with respect to FIG. 18, could be used. Another insulating material could be oil. Such an oil-filled capacitor, in a round aluminum can 12b (such as FIGS. 20A-C) could be used for indoor products, oil can have benefits. One is regarding corona discharge. It allows an automatic fail-safe electrical power discernment feature. Oil also tends not to smoke, like a plastic housing and/or polyurethane filling. The base 20 could have the same geometry as base 20 of FIG. 1 and could be extruded in the aluminum.

A fail safe feature, known in the art, could be added. Wiring could be configured to pull apart if malfunction causes lid 14 to move away because of expansion of oil in an oil-filled capacitor in its can or housing 12b. This would break power to the capacitor. Such expansion upon malfunction is known in the art. It is believed a round can or housing 12b allows this fail-safe function to work better, as it promotes expanding oil to move upward to the lid. Flat sided housing 12 may result in the walls bulging or bursting from expanding fluid. This may not apply sufficient pressure on the lid to cause it to move up for the fail-safe feature.

FIG. 21 of the present application illustrates an alternative way to package multiple capacitors in an integrated assembly. The rectangular-in-cross-section housing encloses a main capacitor (C Main). C Main is relatively large in size (4-5 inches tall) but has an oblate cross-section (in other words, it is flattened along two sides and not circular in cross-section). Smaller secondary capacitors C2, C3, and C4 are positioned along one of the flattened sides of C Main (see FIG. 21) and are themselves flattened. Doing so provides room for the large relative volume for C Main (to provide relatively large surface area for the capacitive element inside C Main) and then allow additional smaller capacitors C2, C3, C4 to be fit within the housing (approximately 5 inches tall by 2½ inches wide by 2½ inches long). Electrical connections from each capacitor are routed through the interior of the housing to external electrical connections on one end of the housing as shown in FIG. 21. As illustrated in FIG. 21, longer wires are needed between C2, C3, and C4 and the external connections.

The invention claimed is:

1. A capacitor assembly comprising:
   (a) a housing defining an interior cavity along a longitudinal axis;
   (b) a base capacitor adapted to provide a first level of operating power to an HID lamp;
   (c) two or more secondary capacitors adapted to selectively increase or decrease operating power relative to the first level of operating power;
   (d) the base capacitor being larger in capacitance than any of the secondary capacitors;
   (e) the base capacitor and each secondary capacitor being positioned in the cavity, wherein the base capacitor occupies substantially all the volume at one end of the cavity generally long the longitudinal axis and the secondary capacitors are positioned in the remaining volume towards the other end of the cavity generally along the longitudinal axis;
   (f) further comprising electrical conduits between each capacitor and an electrical connection interface on one side or portion of the housing allowing selective individual electrical connection to any or all of the capacitors in cavity.

2. The apparatus of claim 1 wherein the capacitors are substantially round in cross-section.

3. The apparatus of claim 1 wherein the height of the base capacitor is less than a conventional capacitor of similar capacitance but wider than a conventional capacitor of similar capacitance.

4. The apparatus of claim 1 further comprising a rack or holder for each of the secondary capacitors, the rack or holder being placeable on either side of the base capacitor along the longitudinal axis.

5. The capacity assembly of claim 1 further comprising a housing mounting interface on a different side or portion of the housing allowing mounting of the capacitor assembly to a structure.

* * * * *

UNITED STATES PATENT AND TRADEMARK OFFICE
CERTIFICATE OF CORRECTION

| | | |
|---|---|---|
| PATENT NO. | : 7,848,079 B1 | Page 1 of 1 |
| APPLICATION NO. | : 11/624604 | |
| DATED | : December 7, 2010 | |
| INVENTOR(S) | : Gordin et al. | |

It is certified that error appears in the above-identified patent and that said Letters Patent is hereby corrected as shown below:

In the Claims

<u>Col. 10, CLAIM 1, LINE 6</u>:
DELETE after generally "long"
ADD after generally --along--

Signed and Sealed this
Eighteenth Day of February, 2014

Michelle K. Lee
*Deputy Director of the United States Patent and Trademark Office*